Figure 1:
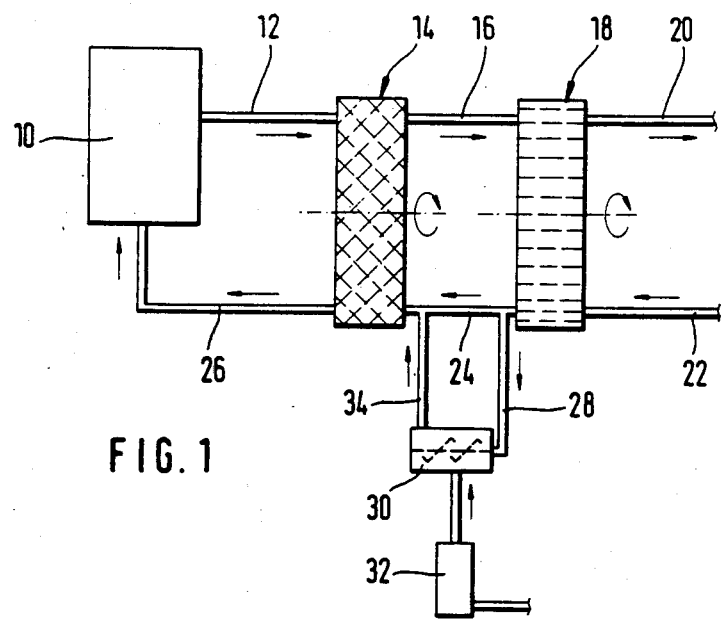

United States Patent [19]
Rieckert et al.

[11] Patent Number: 4,719,094
[45] Date of Patent: Jan. 12, 1988

[54] PROCESS FOR THE SELECTIVE CATALYTIC REMOVAL OF NITROGEN OXIDES FROM THE WASTE GASES OF FURNACES

[75] Inventors: Lothar Rieckert, Karlsruhe; Michael Kotter, Bruchsal, both of Fed. Rep. of Germany

[73] Assignee: Kraftanlagen Ag, Fed. Rep. of Germany

[21] Appl. No.: 865,036
[22] PCT Filed: Aug. 22, 1985
[86] PCT No.: PCT/EP85/00429
 § 371 Date: Apr. 29, 1986
 § 102(e) Date: Apr. 29, 1986
[87] PCT Pub. No.: WO86/01431
 PCT Pub. Date: Mar. 13, 1986

[30] Foreign Application Priority Data

Aug. 29, 1984 [DE] Fed. Rep. of Germany ....... 3431730

[51] Int. Cl.$^4$ .......................... B01J 8/00; C01B 21/00
[52] U.S. Cl. .................................................. 423/239
[58] Field of Search ................... 423/235, 235 D, 239, 423/239 A

[56] References Cited

U.S. PATENT DOCUMENTS

| 4,070,305 | 1/1978 | Obayashi et al. | 423/239 |
| 4,199,554 | 4/1980 | Araki et al. | 423/239 |
| 4,418,046 | 11/1983 | Izumo et al. | 423/247 |

Primary Examiner—Gregory A. Heller

[57] ABSTRACT

Selective elimination of nitrogen oxides contained in the exhaust gases from furnaces.

With the addition of ammonia to the exhaust gases and acceleration of the reaction by a catalyst, the nitrogen oxides are reduced to molecular nitrogen and water. The procedure is such that the catalyst is traversed in one zone by the exhaust gases and in a zone separate therefrom by the fresh air being fed to the furnace as combustion air, while the position of the zones traversed by the exhaust gases and by the fresh air is changed continuously or step-wise such that the zone first traversed by the exhaust gases is then traversed by fresh air, and vice versa.

The ammonia is mixed with the fresh air before it enters the catalyst, bound to the surface of the catalytically active material, and carried along into the zone traversed by the exhaust gases, where the reduction of the nitrogen oxide then takes place.

1 Claim, 2 Drawing Figures

PROCESS FOR THE SELECTIVE CATALYTIC REMOVAL OF NITROGEN OXIDES FROM THE WASTE GASES OF FURNACES

The invention relates to a process for the selective elimination of the nitrogen oxides in the exhaust gases of furnaces by reduction with an externally fed chemical compound, preferably ammonia, with acceleration of the reaction by a catalyst traversed in one zone by exhaust gases and in another zone by fresh air to be delivered as combustion air to the furnace, while the location of the zones through which the exhaust gases and fresh air pass is modified continuously or step-wise such that the sections previously traversed by exhaust gases are then traversed by fresh air, and vice versa, and it relates also to an apparatus for the performance of the process.

For the selective reduction of the nitrogen oxides contained in boiler exhaust gases, for example, it is known to feed into the exhaust gas stream emerging from a furnace vaporous ammonia ($NH_3$) under pressure, or ammonia dissolved in water, without pressure, while an effort is made, by means of a mixing section with appropriate baffling within the adjoining flue gas passages, to achieve a streamer-free distribution of ammonia and temperatures in the exhaust gas stream. Then the mixture is fed to a catalyst preceding a revolving regenerative heat exchanger for the transfer of the exhaust gas heat to the combustion air fed to the furnace. The catalyst is in the form of a solid-bed reactor with a flow directed preferably vertically downward. The reactor contains a honeycomb structure which has a crystalline vanadium-titanium compound as the catalytically active substance. The pressure loss in the solid-bed reactor is taken into account in establishing the size of the flue gas blower. The vertically downward flow in the reactor is intended to combat the depositing of solid impurities within the catalyst or keep them within bounds. The incrustation that occurs is removed discontinuously by blasting with compressed air or steam. The useful life of the catalysts within the reactor amounts to more than two years, depending on the boiler, the manner in which it is operated, and the composition of the coal used as fuel.

An improvement of the useful life of the catalyst is achieved, according to a not previously published proposal of the kind mentioned above (patent application No. P 34 06 657.8), by causing different zones of the catalyst to be traversed by the exhaust gases—including the previously admixed ammonia-on the one hand, and on the other hand by a reverse current of fresh air provided as combustion air for the furnace, the location of the traversed zones being changed constantly, either step-wise or continuously, such that the zone previously traversed by exhaust gases is then traversed by fresh air, and vice versa. By the constantly acting fresh air stream, a prolonged activity of the catalytically active compound of the catalyst, i.e., a lengthening of its useful life, is achieved, in comparison with the formerly practiced discontinuous cleaning with blowing lances. In addition, a reduction of the expense and difficulty of constructing the apparatus is achieved inasmuch as it is possible to couple the catalyst with the rotatory regenerative heat exchanger for preheating the combustion air that is associated with the furnace installation, or even to integrate the catalyst with the regenerative heat exchanger, for example by coating the surface of the heat-storing elements of the regenerative heat exchanger with the catalytically active compound.

It has now been found that the useful life of the catalyst, as well as the operation of any regenerative heat exchanger that may be connected to the output, also depends to a great extent on the development and incrustation of ammonium hydrogen sulfate ($NH_4HSO_4$) on the catalytically active surfaces of the catalyst elements or on the heat-exchanging surfaces of the regenerative heat exchanger, and that this salt, which forms sticky deposits, is formed from the sulfur contained, as a rule, in the furnace flue gases, in conjunction with the ammonia admixed for the reduction of the nitrogen oxides, and with the water and oxygen contained in the exhaust gases.

Accordingly, the invention is addressed to the problem of greatly reducing the formation of ammonium hydrogen sulfate in the catalytic reduction of nitrogen oxides in combustion exhaust gases by ammonia, and thus substantially lengthening the duration of the activity, i.e., the useful life of the catalyst, and preventing impairments of the heat transfer rate in a regenerative heat exchanger if one is used.

Setting out from the knowledge that the catalytically active compounds used for the catalyst, e.g., the above-mentioned crystalline vanadium-titanium compounds, have a decided binding action on ammonia in vapor form, this problem is solved according to the invention by mixing the ammonia with the fresh air before it enters the catalyst. The ammonia required for the reduction of the nitrogen oxides is no longer mixed with the exhaust gases in the section of the flue line that precedes the catalyst, but is mixed with the fresh air fed to the catalyst; it is then held in the catalyst out of the fresh air stream by binding to the catalytically active substance, and is transferred to the zone traversed by the exhaust gases, where the ammonia then produces the desired catalytic reduction of the nitrogen oxides contained in the exhaust gases, and at the same time is decomposed to molecular nitrogen and water.

The ammonia is admixed with the fresh air preferably in such an amount that it is largely bound to the surface of the catalytically active material in the zone of the catalyst that is traversed by the fresh air, and is consumed substantially completely in the reduction of the nitrogen oxides contained in the furnace flue gases when the latter subsequently flow through it. In the exhaust gas flowing to the catalyst no ammonium hydrogen sulfate can form due to the lack of ammonia, and the ammonia fed to the catalyst itself from the fresh-air end is consumed substantially completely in the reduction of the nitrogen oxides, so that this harmful salt forms hardly at all in the catalyst. It is also to be noted that, even if the feeding of ammonia to the fresh air stream takes place quantity-wise such that part of the ammonia remains in the fresh air and is then fed to the furnace, this does not mean that ammonia also comes out of the furnace with the exhaust gases. This is because the ammonia fed through the fresh air is decomposed at the temperatures prevailing in the furnace, so that therefore no more than a slightly greater amount of molecular nitrogen might be contained in the exhaust gases, but it does no harm.

The apparatus provided for the performance of the process according to the invention, in which the catalyst is formed by catalyst elements disposed in a support, and the support and the connections for the zone-wise passage of the exhaust gases or fresh air through the catalyst are constructed for rotation relative to one another, and a drive means is provided for the step-wise or continuous rotation of the apparatus, is preferably constructed such that, in the fresh air duct situated ahead of the catalyst in the direction of flow, and leading to the catalyst connection for the fresh air, there is disposed the outlet of an ammonia admixture line supplied by an ammonia source. The ammonia injected into the fresh air can be distributed in the fresh air by a mixing section constituted by suitable baffling in the fresh-air duct, or, alternatively, a premixing of the ammonia with a partial stream of fresh air conducted in a bypass around the main stream of the fresh air can be performed, and the partial stream can then be returned to the fresh-air duct ahead of the catalyst.

Figure 2:
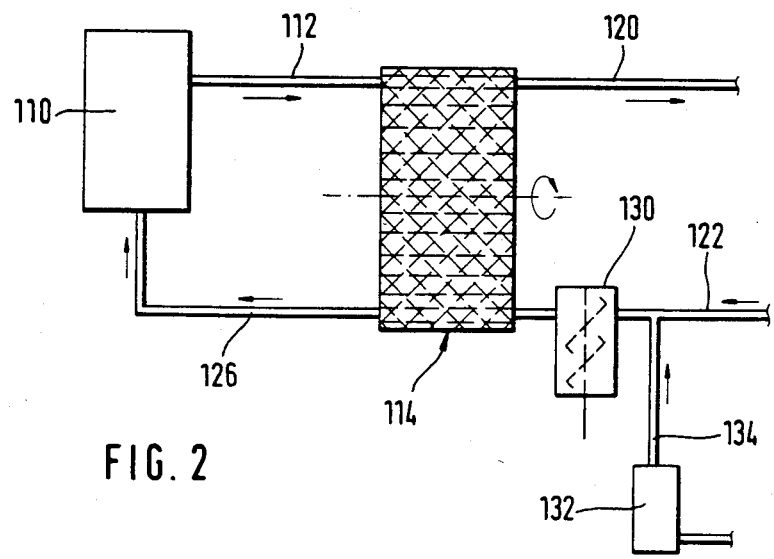

The invention will be further explained in the description that follows of two embodiments, in conjunction with the drawing, wherein:

FIG. 1 is a circuit diagram of a furnace with a catalyst and regenerative heat exchanger connected to it, and FIG. 2 is a circuit diagram of a variant furnace in which the catalyst and the regenerative heat exchanger are combined in a common unit.

In the apparatus represented diagrammatically in FIG. 1, the exhaust gases from the furnace 10 pass through a duct 12 to a catalyst 14 which can be composed of catalyst elements disposed in a continuous, rotating support. The exhaust gases delivered through the duct 12 flow through the catalyst 14 in the zone (upper zone in FIG. 1) in which the catalytic reduction of the nitrogen oxides contained in the exhaust gases takes place. The exhaust gases leaving the catalyst along with molecular nitrogen and water then pass through a duct 16 into the rotatory regenerative heat exchanger 18 for the transfer of the exhaust gas heat to the fresh air that is to be fed to the furnace as combustion air. After the rotatory regenerative heat exchanger, the exhaust gases then pass through the exhaust gas duct 20 into the apparatus (not shown) for the separation of the sulfur compounds and for reheating for entry into the exhaust stack.

The fresh air that is to be fed to the furnace 10 as combustion air passes through duct 22 first into the revolving regenerative heat exchanger 18, is preheated in the latter countercurrently to the exhaust gases, and is then carried through a duct 24 to the catalyst 14 and through the catalyst, again countercurrently to the exhaust gases, in a zone—the bottom zone in FIG. 1. From the exit side opposite the entry side of the catalyst 14 the fresh air then flows through a duct 26 to the furnace 10.

The injection of the ammonia required for the reduction of the nitrogen oxides in the catalyst 14 takes place in the fresh-air duct 24 running between the outlet from the regenerative heat exchanger 18 and the inlet of the catalyst 14, a partial stream of the fresh air being taken from duct 24 behind the catalyst 18 and fed into a duct 28 to a mixing section 30 into which ammonia ($NH_3$) is fed from a supply tank 32, and it is metered into the partial stream of fresh air. Then the partial stream of fresh air is returned through duct 34 to the mainstream of the fresh air and thus it is fed to the catalyst 14 which revolves step-wise or continuously. In the zone of the catalyst through which fresh air flows, the ammonia contained in the fresh air is bound to the catalytically active compound which is exposed at the surfaces of the catalyst elements and it is transferred to the zone through which the exhaust gas flows, where the desired reduction of the nitrogen oxides to nitrogen and water takes place.

Basically, separate drives can be associated with the catalyst 14 and the regenerative heat exchanger 18. However, to reduce the cost and complexity of construction, it is recommended to associate one common drive with both units, for example by driving the regenerative heat exchanger with a motor, in the usual manner, and coupling the catalyst with the heat exchanger by means of a shaft.

In the modified apparatus represented in FIG. 2, the catalyst 14 and the regenerative heat exchanger 18 of the embodiment according to FIG. 1 are combined into a common functional unit 114, in that heat-storage elements constituting the storage mass of the regenerative heat exchanger are disposed in a common, rotated support, these elements being coated on at least a portion of their surface with the catalytically active compound, e.g., a crystalline vanadium-titanium compound, so that these storage elements therefore serve simultaneously for the transfer of heat from the exhaust gases to the fresh air and of making catalytically active surfaces available in the exhaust gas stream. On account of the combining of the catalyst with the regenerative heat exchanger, the ducts 16 and 14, which carry exhaust gas and fresh air, respectively, between the catalyst and the heat exchanger 18, are eliminated, while otherwise the system is largely the same.

To avoid unnecessary repetitions, only differences between this embodiment and the one already described will be explained, while it will suffice to refer otherwise to the description of the embodiment according to FIG. 1, inasmuch as the same reference numbers are associated with the functional elements represented in FIG. 1 which correspond to one another, except that a number 1 is prefixed to them in the case of the embodiment in FIG. 2.

Since one duct corresponding to the fresh-air duct 24 is lacking in the embodiment in FIG. 2, the ammonia in this second embodiment is fed from the ammonia supply tank 132 through a duct 134 into the fresh air fed through duct 122, which then is carried in its entirety through a mixing section 130 before it enters the functional unit 140 in which the regenerative heat exchanger and the catalyst are integrated.

It is apparent that, within the scope of the invention, modifications and further developments can be realized. For example, the catalyst 14 of the embodiment in FIG. 1 can also have an independent drive separate from the drive of the regenerative heat exchanger 18, so that the catalyst can be driven continuously or step-wise, independently of the heat exchanger drive. The feeding of the ammonia to the embodiment represented in FIG. 2, like the embodiment in FIG. 1, can also be performed in a partial stream tapped from the fresh-air stream, which after mixing with the ammonia, is then returned to the fresh-air mainstream. In each case it is essential only that the ammonia be fed to the catalyst through the incoming fresh air and that, by bonding to the catalytically active compound, it be transferred in the catalyst itself to the zone traversed by the exhaust gas.

We claim:

1. In a process for the selective elimination of nitrogen oxides from furnace exhaust gases by reduction with ammonia which has the reaction accelerated by a catalyst which is traversed by the exhaust gases in a first zone and is regenerated in a second zone by fresh air to be fed to the furnace with the position of the first and second catalyst zones being changed continuously, the improvement which comprises mixing the ammonia with the fresh air before that fresh air-ammonia mixture contacts the catalyst with the ammonia being admixed with the fresh air at such a rate that it is bound to the surface of the catalytically active material in the zone of the catalyst which is traversed by fresh air and is consumed in the reduction of the nitrogen oxides contained in the exhaust gases during the subsequent traversal by the latter.

* * * * *